Aug. 25, 1959 E. GORIN ET AL 2,901,524
METHOD FOR GENERATING ELECTRICAL ENERGY FROM
ELECTROCHEMICAL COMBUSTION OF FUEL GASES
Filed April 2, 1956 4 Sheets-Sheet 1

INVENTORS.
EVERETT GORIN
BY HOWARD L. RECHT

*Harry B. Keck*
ATTORNEY

United States Patent Office 2,901,524
Patented Aug. 25, 1959

2,901,524

METHOD FOR GENERATING ELECTRICAL ENERGY FROM ELECTROCHEMICAL COMBUSTION OF FUEL GASES

Everett Gorin and Howard L. Recht, Pittsburgh, Pa., assignors to Consolidation Coal Company, a corporation of Pennsylvania Application April 2, 1956, Serial No. 575,586

12 Claims. (Cl. 136—86)

The present invention relates to a method for generating electrical energy through electrochemical combustion of a fuel gas with an oxygen-containing gas in an electrochemical cell, i.e., the so-called "fuel cell," and more particularly to a method for minimizing voltage decreases which normally result from concentration polarization in such electrochemical cells.

Fuel cells have been described in publications, proposed and constructed for generating electrical energy through combustion of gases. In general the fuel cell comprises a housing having separate gas passageways therein for the reactant gases, i.e., a fuel gas such as carbon monoxide and/or hydrogen in one gas passageway and an oxidizing gas such as air in the other gas passageway. The gas passageways are separated by an oxygen-transferring electrolyte which, for high temperature fuel cells, normally comprises a refractory mixture of oxygen-containing salts such as carbonates, oxides, silicates, phosphates and the like. The oxygen-containing salts may be used alone or supported on an inert refractory such as magnesia. Under operating conditions the electrolyte must provide a medium in which ionic mobility can be achieved. Thus the so-called "solid" electrolyte is not a true solid. The oxidizing gas side of the electrolyte comprises one electrode and the fuel gas side of the electrolyte comprises another electrode of the fuel cell. When current is drained from the two electrodes, there is a net flow of electrons from the fuel gas side through an external electrical circuit to the oxidizing gas side. Hence, according to the external electron flow convention, the oxidizing gas side electrode will be characterized the positive electrode and the fuel gas side electrode the negative electrode throughout this specification. Oxygen is consumed at the positive electrode surface and fuel gas is oxidized into products of combustion at the negative electrode surface. This result is accompanied by release of a portion of the energy of combustion as electrical energy while the remainder is released as heat.

Successful operation of the fuel cell has been obtained at temperatures within the range of about 450 to 1600° F. Below about 850° F., the available power supply is seriously diminished due to slow electrode reactions; at temperatures above about 1600° F., the materials of construction exhibit deterioration. Preferably a fuel cell is maintained with substantially equal gas pressures on each side of the oxygen-transferring electrolyte in order to minimize mechanical stresses to which the "solid" electrolyte will be subjected. The operating pressures may vary from about 1 to 50 atmospheres, provided the pressure of the two streams of reactant gases is substantially equal. Preferably the operating pressure is from about 1 to about 5 atmospheres.

The precise construction of the fuel cell forms no part of the present invention. Such cells have been fully described in the literature. "Gas Cell With Solid Electrolyte," Bull. Acad. Sci. USSR. Classe Sci. Tech. 215–218 (1946); Zeit. fur Electrochemie 27, 199–208; ibid 44, 727–32 (1937); U.S. Patent 2,384,463 (1945); Ketelaar, J.A.A., Dr. Ingenieur 66, E85–91 (1954).

When these "solid" electrolyte fuel cells are operated over extended time periods, the electrical power output diminishes. Under conditions of constant current drain from the cell, the output voltage decreases. This decrease is occasioned by a phenomenon known as concentration polarization which is manifested within the "solid" electrolyte.

It is the object of this invention to diminish the concentration polarization within "solid" electrolytes containing carbonates or materials readily convertible to carbonates through the action of carbon dioxide, e.g., silicates. This object is accomplished, according to the invention, by first providing carbon dioxide in the oxidizing reactant gas and second removing carbon dioxide from the reactant fuel gas in an integrated system. Maintenance of the carbon dioxide balance which offsets the concentration polarization is accomplished according to the present invention by employing a solid reactant material which has a reversible carbon dioxide absorption property. An example of such a solid reactant material is a mixture of calcium oxide and calcium carbonate, which can be subjected to the reversible reaction:

$$CaO + CO_2 \rightleftarrows CaCO_3$$

When the above reaction proceeds from left to right, the solid reactant material functions as an "acceptor" for carbon dioxide to remove it from a gas phase. When the above reaction is reversed, the solid reactant material functions as a "donor" of carbon dioxide by evolving it into a gas phase. Hereinafter such solid reactant materials are referred to as "acceptors," it being understood that an "acceptor" can perform both acceptor and donor functions under the proper conditions as will be hereinafter described.

Other alkaline earth oxides and carbonates also may be used as the acceptor provided their carbon dioxide absorbing and releasing conditions are properly integrated with the operating conditions of the fuel cell. Barium and strontium, for example, might be selected as the alkaline earths in place of calcium. The preferred acceptor, however, is a mixture of calcium oxide and carbonate because its properties are readily integrated with the operation of a high temperature fuel cell. The calcium oxide in the acceptor acts as an absorber for carbon dioxide resulting from combustion of fuel gas; the calcium carbonate provides a source of carbon dioxide for addition to the oxidizing gas.

A further object of the present invention is to provide a means for continuously removing the product of combustion, i.e., carbon dioxide, from the fuel gases to maximize the efficiency of utilization of fuel gas and to minimize fuel gas recycle requirements.

For a better understanding of the present invention, its objects and advantages, reference should be had to the following detailed description and accompanying drawings in which.

The concentration polarization phenomenon can be described in detail by reference to the fuel cell shown in Figure 1. The fuel cell 10 comprises a housing 11 confining a "solid" electrolyte 12 which can be a thin flat plate of an oxygen-transferring porous refractory mixture impregnated with sodium carbonate (as shown in cross-section in Figure 1). The "solid" electrolyte 12 is mounted within the housing 11 by supporting means, schematically illustrated and identified by the numeral 13 which serve the dual function of electrically insulating the opposed surfaces of the "solid" electrolyte 12 from each other and also of providing, in combination with the "solid" electrolyte 12, a gas-tight separation element which divides the interior of the housing 11 into two chambers 14 and 15 hereinafter called gas passageways. It is well known in the art to provide an activator coating on the surfaces of the "solid" electrolyte for promoting fuel cell reaction. Iron and iron oxide, for example, have been used for this purpose.

Two electrodes 16 and 17, each comprising a perforate sheet of material having low electrical resistance, are provided, one for each surface of the "solid" electrolyte 12 in communication with the gas passageways 14 and 15 respectively. The electrodes 16 and 17 are separated from each other by the "solid" electrolyte 12. An inlet conduit 18 is provided in the housing 11 for introducing an oxidizing gas, usually air, into the gas passageway 14. An outlet conduit 19 is provided in the housing 11 for withdrawing gases, depleted of oxygen, from the gas passageway 14. An inlet conduit 20 is provided in the housing 11 for introducing fuel gas into the gas passageway 15. An outlet conduit 21 is provided in the housing 11 for withdrawing unconsumed fuel gas along with oxidized products of combustion from the gas passageway 15.

The electrode 16 in the oxidizing gas passageway 14 is a positive electrode electrically joined to a positive bus bar by a conductor 22. The electrode 17 in the fuel gas passageway 15 is a negative electrode electrically joined to a negative bus bar by a conductor 23.

The simplified positive electrode reaction involves conversion of oxygen gas into oxide ion which may be expressed as $$\frac{1}{2}O_2 + 2e^- \longrightarrow O^=$$

The simplified negative electrode reaction involves combination of oxide ion with fuel gas. Where carbon monoxide is the fuel gas, this reaction may be expressed as $$CO + O^= \longrightarrow CO_2 + 2e^-$$

and, where hydrogen is the fuel gas, the reaction may be expressed as $$H_2 + O^= \longrightarrow H_2O + 2e^-$$

If the "solid" electrolyte be considered as comprised of sodium carbonate, the sodium ions migrate toward the positive electrode and the carbonate ions toward the negative electrode. The sodium ions tend to accumulate near the positive electrode surface since (1) the sodium ions have greater mobility than the carbonate ions and (2) some carbon dioxide resulting from reaction is evolved from the negative electrode surface which evolution reduces the quantity of carbonate ion available. Because of this differential migration rate for ions within the "solid" electrolyte, the rate of formation of oxide ions at the positive electrode surface exceeds the rate of counterdiffusion toward the negative electrode.

$$\frac{1}{2}O_2 + 2Na^+ + 2e \longrightarrow Na_2O$$

Similarly at the negative electrode surface carbonate ions form oxide ion and carbon dioxide $$CO_3^= \longrightarrow CO_2 + O^=$$

Increasing pressures of carbon dioxide at the negative electrode result in decreased concentration of oxide ion.

The result of the changes in ion concentrations within the "solid" electrolyte is a reduction in output voltage (at constant current drain) from the fuel cell. This phenomenon has been reported by prior investigators of fuel cells. One proposal for compensating concentration polarization calls for cyclically reversing the flow of gas through the fuel cell (accompanied by reversal of electrical current flow) so that the tendency to promote concentration polarization will be reversed and hence neutralized. This technique requires that the electrochemical cell be reversible, i.e., the electrode surfaces must function equally well as a positive electrode or a negative electrode during passage of fuel gas thereover (Mond and Langer, Proceedings of the Royal Society (London) 46, 296–304, June 20, 1889).

Another proposed technique for compensating concentration polarization calls for adding carbon dioxide to the oxidizing gas side of the "solid" electrolyte to reform sodium carbonate by combining with the accumulated oxide and sodium ions at the positive electrode surface. U.S. Patent 2,384,463 (1935). The fuel cell attains a steady-state equilibrium output voltage at constant current drain when the carbon dioxide absorption rate at the positive electrode equals the rate of carbonate ion decomposition at the negative electrode. This technique does not require reversible properties in the electrochemical cell and hence the electrode surfaces may be fabricated to possess differing properties, if desired.

The carbon dioxide addition technique, according to the present invention, can be further improved by increasing the efficiency of carbon dioxide removal from the negative electrode surfaces and recovering thus formed carbon dioxide for reuse as the additive on the positive electrode surface.

At least two mols of carbon dioxide should be added to the oxidizing gas stream for each mol of oxygen consumed in the fuel cell in order to provide a balanced carbon dioxide cycle throughout the system, i.e., a condition in which no extrinsic carbon dioxide is required; all carbon dioxide results from combustion of fuel gas; and all net carbon dioxide is rejected from the system in the exhaust air stream. Proper selection of temperature and pressure permits the desired carbon dioxide balancing to be achieved. Where acceptors for carbon dioxide are employed, alternative methods may be selected: (1) the acceptor is maintained within the gas passageways of the cell itself, either as a batch or as a continuously replacing body of acceptor; (2) the acceptor is provided in the gas flow system outside the fuel cell itself, either as a batch or as a continuously replacing body of acceptor. In either case, the positive electrode reaction becomes $$CO_2 + \frac{1}{2}O_2 + 2e^- \longrightarrow CO_3^=$$

wherein each half-mol of oxygen requires one mol of carbon dioxide to form the carbonate ion which actually transfers oxygen through the "solid" electrolyte to the negative electrode. The negative electrode reaction (assuming CO as the fuel gas) becomes $$CO_3^= + CO \longrightarrow 2CO_2 + 2e^-$$

wherein two mols of carbon dioxide are formed for each mol of carbon monoxide consumed through combination with carbonate ion.

*Case I—The acceptor is maintained in the gas passageway of the fuel cell*

In this situation two mols of carbon dioxide must be rejected as exhaust gases for every mol of oxygen consumed in the fuel cell since the overall fuel cell reaction is $$\frac{1}{2}O_2 + CO \longrightarrow CO_2$$

Hence the partial pressure of carbon dioxide required in the exhaust gases under balanced conditions is a function of the total pressure and oxygen utilization within the fuel cell. If the carbon dioxide content of the exhaust gases be expressed as mol fraction, the effect of total pressure is cancelled and the required mol fraction of carbon dioxide in the exhaust gases can be related to the oxygen utilization.

Consider the situation where air is the oxidizing gas and 100% oxygen utilization results. To simplify the example, air will be considered as comprised of 4 mols of nitrogen and 1 mol of oxygen. The inlet air then contains 4 mols of nitrogen and 1 mol of oxygen. For this example, the 1 mol of oxygen is consumed and hence 2 mols of carbon dioxide must be rejected from the fuel gas passageway. Thus the exhaust gases comprise 4 mols of nitrogen and 2 mols of carbon dioxide. The mol fraction of carbon dioxide in the exhaust gases, hence, is 0.33. Under these conditions, the acceptor should be maintained under temperature and pressure conditions which provide an equilibrium with 0.33 mol fraction of carbon dioxide in the vapor phase. Using calcium carbonate as the acceptor, the stated conditions prevail for 1 atmosphere total pressure at about 1500° F. and for 5 atmosphere total pressure at about 1710° F.

Consider next the situation where air is the oxidizing gas and 66⅔ percent oxygen utilization is achieved. Here the inlet gas, as before, contains 4 mols of nitrogen for each mol of oxygen. The exhaust gas, however, contains ⅓ mol of oxygen, 4 mols of nitrogen and ⅘ mols of carbon dioxide. Thus the mol fraction of carbon dioxide in the exhaust gases required to maintain the desired balance is 0.24. The temperature required to maintain this mol fraction of carbon dioxide in the gases in the equilibrium with calcium carbonate at 1 atmosphere total pressure is about 1470° F. For 5 atmospheres total pressure, the required equilibrium temperature is about 1660° F.

Thus the oxygen utilization achieved within the fuel cell must be considered determining what constitutes "CO₂ releasing conditions" where a balanced CO₂ cycle is desired. The conditions will vary for different acceptors. For the case of CaO/CaCO₃ as acceptor, temperatures in the range of 1350 to 1700° F. are satisfactory for the present integrated fuel cell system. The net result of such a balanced carbon dioxide cycle is a complete utilization of fuel gas without external separation of carbon dioxide and also a rejection of the carbon dioxide formed by combustion as a component of the exhaust air stream.

*Case II—The acceptor is provided in the gas flow system outside the fuel cell itself*

In this suitation, the air entering the gas passageways must include sufficient carbon dioxide to supply the requirements of the "solid" electrolyte and also to exhaust the net carbon dioxide produced by the fuel cell. Again, two mols of carbon dioxide must be rejected as exhaust gas for each mol of oxygen consumed in the fuel cell since the overall reaction (assuming carbon monoxide as the fuel gas) is:

$$CO + \frac{1}{2}O_2 \longrightarrow CO_2$$

Considering the case of 100 percent oxygen utilization as before, the inlet gases to the fuel cell contain 4 mols nitrogen, 1 mol oxygen, and 4 mols carbon dioxide, whereas the exhaust gases contain 4 mols nitrogen and 2 mols carbon dioxide. In this case, the mol fraction of carbon dioxide in equilibrium with the acceptor must be 4/9 or 0.44. At one atmosphere total pressure, the requisite temperature for calcium carbonate as acceptor is about 1540° F.; at 5 atmospheres total pressure, the requisite temperature is about 1760° F.

Considering a case of 66⅔ percent oxygen utilization, the exhaust gases from the fuel cell contain 4 mols nitrogen, ⅓ mol oxygen and ⅘ mol carbon dioxide; the inlet gases contain 4 mols nitrogen, 1 mol oxygen and ⅝ mol carbon dioxide. Thus the mol fraction of carbon dioxide in the inlet gases is 0.35. Where CaO/CaCO₃ is used as the acceptor, the required equilibrium temperature at one atmosphere total pressure is about 1510° F. and, at 5 atmospheres total pressure, is about 1715° F.

Thus the "CO₂ releasing conditions" are seen to vary with the oxygen utilization achieved within the fuel cell and with the material employed as acceptor. "CO₂ absorbing conditions" for treating fuel gases can be provided similarly by selecting pressures and temperatures tending to favor the reversed acceptor reaction $$CO_2 + CaO \rightarrow CaCO_3$$

where CaO/CaCO₃ is employed as acceptor.

One form of this invention also calls for using the cell reversal technique in conjunction with the carbon dioxide addition technique. This system will be described by reference to the apparatus illustrated in Figure 2 where a fuel cell 29 having a housing 30, contains a "solid" electrolyte 31, two reversible electrodes 32 and 33 and insulation means 34 which divide the housing 30 into two gas passageways 35 and 36. The gas passageways 35 and 36 are packed with batches 37 and 38 of acceptor preferably a mixture of calcium oxide and carbonate. The acceptor preferably is in pelleted form. One gas passageway contains an excess of calcium oxide; the other an excess of calcium carbonate.

Figure 2:
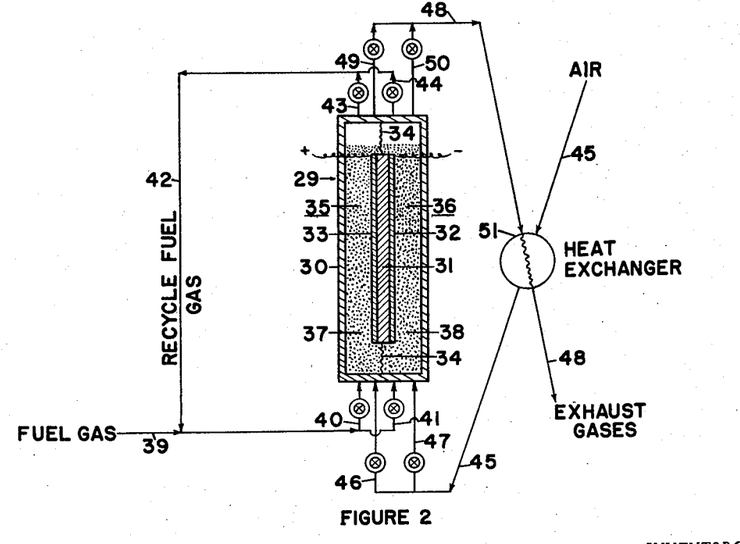
Figure 2 is a schematic flow diagram illustrating one embodiment of the present invention showing a generalized fuel cell in cross-section wherein a batch of acceptor is confined within each of the gas passageways of the fuel cell itself.

A fuel gas supply manifold 39 has two valved conduits 40 and 41 joined to the gas passageways 35 and 36 respectively to permit introduction of fuel gas thereinto. A recycle fuel gas manifold 42 receives fuel gas from the gas passageways 35 and 36 through the valved conduits 43 and 44 respectively for reintroduction into the fuel gas supply manifold 39.

An air supply manifold 45 has two valved conduits 46 and 47 for introducing air into the gas passageways 35 and 36 respectively. A manifold conduit 48 receives oxygen-depleted air containing carbon dioxide from the gas passageways 35 and 36 through valved conduits 49 and 50 respectively for disposal as flue gas. If desired, the sensible heat of gases in the manifold conduit 48 may be employed to preheat reactant gases, as, for example, in a heat exchanger 51 for preheating the air supply.

As mentioned previously, the embodiment of the invention illustrated in Figure 2 employs a reversible electrolyte along with carbon dioxide balancing to counteract concentration polarization. During one half of the reversible cycle, the electrode 32 is a positive electrode and the electrode 33 is a negative electrode. The valves in conduits 41, 46, 44 and 49 are closed; the valves in conduits 40, 47, 43 and 50 are open; thus fuel gas passes through the gas passageway 35 which contains a batch 37 of acceptor under CO₂ absorbing conditions. Air passes through the gas passageway 36 which contains a batch 38 of acceptor under CO₂ releasing conditions. When a CaO/CaCO₃ mixture is employed as the acceptor, the batch 37 initially has an excess of calcium oxide whereas the batch 38 initially has an excess of calcium carbonate.

Any carbon dioxide evolved from the fuel cell reactions at the negative electrode surface in gas passageway 35 is absorbed on the calcium oxide of the batch 37 of acceptor. Elimination of this carbon dioxide from the fuel gas passageway avoids the inhibition of the electrode reaction.

$$CO_2 + CaO \rightarrow CaCO_3$$

The unreacted fuel gases leaving the gas passageway 35 through conduit 43 are automatically maintained at a constant level of carbon dioxide contamination, namely the equilibrium concentration of carbon dioxide over the acceptor at the existing temperature and pressure. Where pure carbon monoxide is employed as a fuel gas, no recirculation of fuel gas is required.

Air, in passing over the batch 38 of acceptor in the gas passageway 36, absorbs carbon dioxide from the calcium carbonate for deposition on the electrode 32 to offset concentration polarization.

$$CaCO_3 \rightarrow CaO + CO_2$$

Following a period of fuel cell operation according to the described half of the reversible cycle, the batch 37 of acceptor is converted to a material having an excess of calcium carbonate and the batch 38 is converted to a material having an excess of calcium oxide. Further operation in the same half cycle will result in decreased power output from concentration polarization which begins to occur as the acceptor batches 37 and 38 approach maximum utilization for their intended purpose during the half cycle. Thereupon gas flow and electrode reversal is effected by closing the valves in conduits 40, 47, 43 and 50 and opening the valves in conduits 41, 46, 44 and 49 to commence the alternate half cycle in which electrode 32 is a negative electrode, electrode 33 is a positive electrode, gas passageway 35 receives air, gas passageway 36 contains fuel gas, the batch 37 of acceptor contains initially an excess of calcium carbonate and the batch 38 of acceptor contains initially an excess of calcium oxide.

The two half cycles of operation of the fuel cell illustrated in Figure 2 are repeated alternately to provide a nearly continuous supply of electrical power. The advantages of fuel cell reversal in minimizing effects of concentration polarization are inherently derived from this embodiment of the invention. However this embodiment requires that the electrode surfaces 32 and 33 be designed to function as both positive and negative electrodes. Improvements resulting from specific properties which otherwise might be designed for a positive or a negative electrode surface cannot be realized. Moreover the required "reactivation" period for conditioning electrode surfaces for the changed electrode function results in discontinuity of electrical power supply.

The carbon dioxide produced in the fuel cell reaction is recovered from the fuel gas and re-employed as the carbon dioxide addition to the oxidizing gas stream. The net product carbon dioxide from the fuel cell is discharged from the system through the conduit 48 along with oxygen-depleted air.

Where hydrogen is employed in whole or in part as the fuel gas, some means must be provided for removing the water formed as a product of combustion within the fuel cell to avoid buildup of water concentration in the recirculating fuel gas stream. Water condensation means suitably may be provided in the recycle fuel gas conduit 42.

Figure 3:
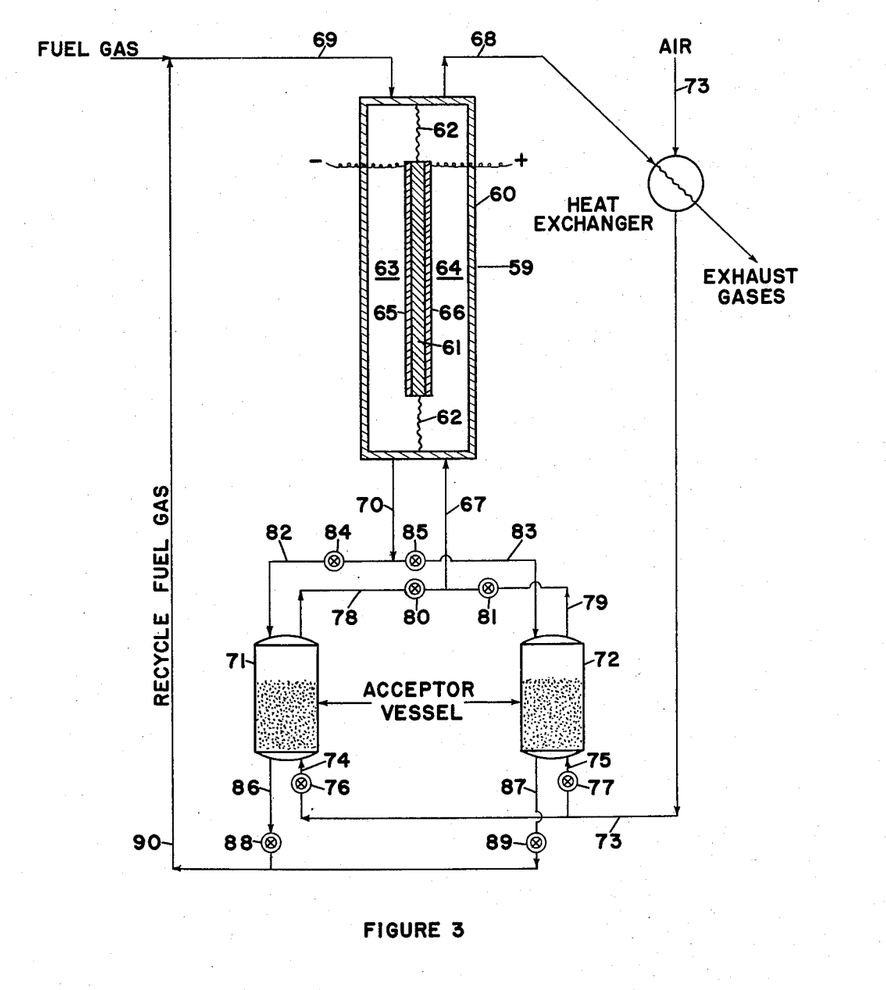
Figure 3 is a schematic flow diagram illustrating another embodiment of the present invention showing a generalized fuel cell in cross-section and two batches of acceptor, apart from the fuel cell, for treating the reactant gases.

The embodiment illustrated in Figure 3 employs two batches of acceptor which are out of contact with the fuel cell itself. This embodiment of the invention eliminates the need for reversal of electrodes and gas flow through the fuel cell.

Figure 1:
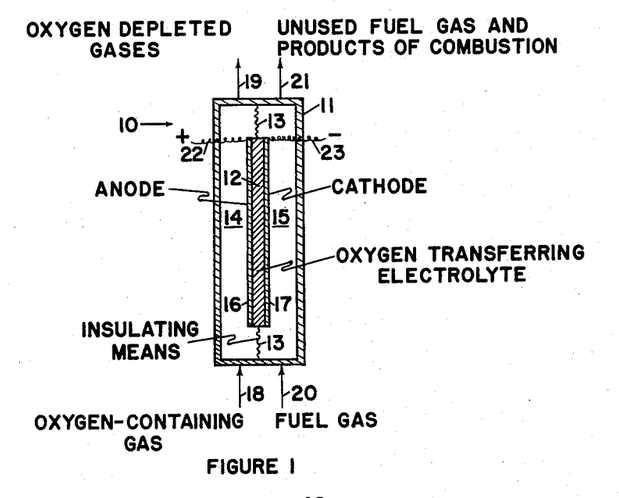
Figure 1 is a schematic illustration of a generalized fuel cell in cross section.

Corresponding to the apparatus illustrated in Figure 1, a fuel cell 59 comprises a housing 60, a "solid" electrolyte 61, supporting and insulating means 62, a fuel gas passageway 63, an air pasageway 64, a negative electrode surface 65, a positive electrode surface 66, an air inlet conduit 67, removal conduit 68 for oxygen-depleted air and carbon dioxide, a fuel gas inlet conduit 69 and a fuel gas withdrawal conduit 70.

The reversible carbon dioxide absorption and recovery cycle is carried out in two vessels 71 and 72 which contain an inventory of acceptor preferably in the form of pellets or lumps. Where the acceptor is $CaCO_3/CaO$, the inlet air stream picks up carbon dioxide from the acceptor during passage through one of the vessels 71 or 72 while the exhausted fuel gas stream deposits carbon dioxide onto the acceptor in the other of the acceptor vessels 72 or 71. Cyclic operation is effected by manipulating the valves of the system to cause the acceptor in the vessels 71 and 72 to function alternately as a carbon dioxide absorbing material and as a carbon dioxide releasing material.

An air supply conduit 73 communicates with two valved conduits 74 and 75 having valves 76 and 77 respectively for introducing air into the acceptor vessels 71 and 72 respectively. Air withdrawal conduits 78 and 79 having valves 80 and 81 respectively join the acceptor vessels 71 and 72 respectively with the air supply conduit 67 for the fuel cell 59.

The spent fuel gas conduit 70 communicates with the acceptor vessels 71 and 72 by means of conduits 82 and 83 respectively having therein valves 84 and 85 respectively. Fuel gases, treated with the acceptor in the vessel 71 or 72, are discharged, having an equilibrium content of carbon dioxide through the conduits 86 and 87 which have valves 88 and 89 respectively into a fuel gas recycle conduit 90 for recirculation in the system through the fuel gas supply conduit 69. Water condensation means may be provided in the conduit 90 if necessary.

During one half of the operating cycle, the acceptor vessel 71 functions as a carbon dioxide absorbing vessel and the acceptor vessel 72 functions as a carbon dioxide releasing vessel. The valves 76, 80, 85 and 89 are closed; the valves 77, 81, 84 and 88 are open. Air from the air supply conduit 73 passes through the acceptor vessel 72 via conduit 75 and picks up carbon dioxide from the calcium carbonate contained therein. Air containing carbon dioxide passes through the conduits 79 and 67 into the air passageway 64 of the fuel cell 59. Concurrently spent fuel gases, withdrawn from the fuel gas passageway 63 of the cell 59, pass through conduits 70 and 82 for removal therefrom of carbon dioxide in the acceptor vessel 71. Fuel gases, containing an equilibrium concentration of $CO_2$, are withdrawn through the conduit 86 and 90 for recirculation. During this half of the operating cycle, the exothermic carbon dioxide absorption process results in heating of the acceptor material in the vessel 71 and the endothermic carbon dioxide releasing process results in a cooling of the acceptor in the vessel 72.

When the carbon dioxide absorbing capacity of the acceptor in the vessel 71 and the carbon dioxide releasing capacity of the acceptor in the vessel 72 have been substantially diminished, the first half cycle is terminated and the second half cycle commenced. At this moment the acceptor in the vessel 71 is principally in the form of calcium carbonate at an elevated temperature resulting from the exothermic carbon dioxide absorption. Similarly the acceptor in the vessel 72 is principally in the form of calcium oxide at a reduced temperature resulting from the endothermic carbon dioxide releasing process. During the second half cycle, the valves 77, 81, 84 and 88 are closed and the valves 76, 80, 85 and 89 are open. Air now passes from the air supply conduit 73 through the conduit 74 into the acceptor vessel 71 where it picks up carbon dioxide from the hot acceptor contained therein. Air containing carbon dioxide passes through the conduits 78 and 67 into the air gas passageway 64 of the fuel cell 59. Concurrently, fuel gases from the spent fuel gas withdrawal conduit 70 pass through the conduit 83 into the acceptor vessel 72 to deposit carbon dioxide on the acceptor contained therein. Fuel gases, substantially free of carbon dioxide, are withdrawn through the conduits 87 and 90 for recirculation in the system through the fuel gas supply conduit 69.

In the embodiment of Figure 3, the carbon dioxide acceptor material is not in contact with the electrode surfaces 65 and 66. The exothermic heat from the fuel cell 59 may be employed to generate the fuel gas required to operate the cell as described in U.S. Patents 2,570,543, 2,581,650 and 2,581,651. Since the electrode 65 is at all times a negative electrode and the electrode 66 is at all times a positive electrode, there is no discontinuity in electrical power supply resulting in this embodiment. Moreover, the electrodes 65 and 66 may be designed independently to introduce special properties.

In this embodiment, the carbon dioxide produced in the fuel gas passageway 63 is not removed in situ but passes therethrough for subsequent removal in one of the acceptor vessels 71 and 72. By increasing the rate of fuel gas flow through the fuel gas passageway 63, the partial pressure of carbon dioxide therein may be maintained at a low value. For example, if at least ten parts of fuel gas pass through the fuel gas passageway 63 for every part of fuel gas consumed, the carbon dioxide concentration in the gases withdrawn through conduit 70 may be maintained at below 10 percent.

Figure 4:
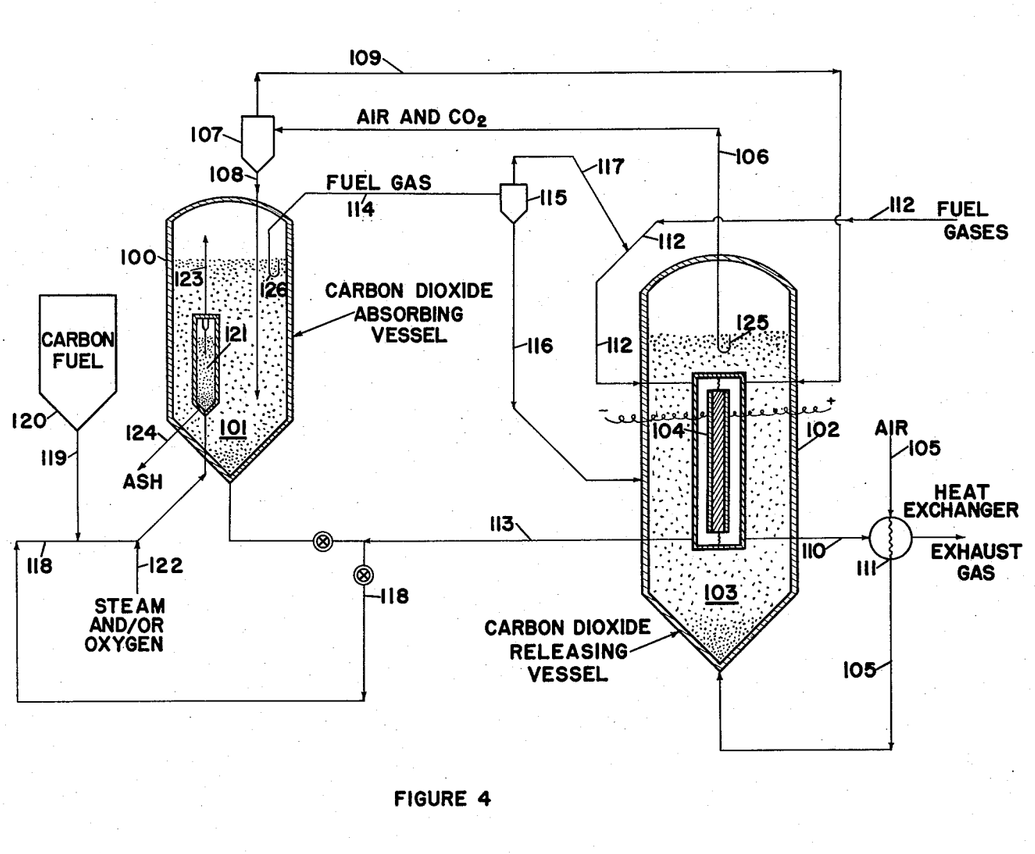
Figure 4 is a schematic flow diagram illustrating a further embodiment of the present invention showing a generalized fuel cell in cross-section integrated into a continuous recirculating acceptor system.

A further embodiment of this invention illustrated in Figure 4 provides continuously recirculating acceptor material maintained out of contact with the electrode surfaces of the fuel cell. The need for electrode reversal and gas flow reversal through the fuel cell is obviated in this embodiment.

Two vessels containing fluidized beds of acceptor material are provided having appropriate connections for the carbon dioxide balancing cycle. A carbon dioxide absorbing vessel 100 is adapted to confine a bed 101 of finely divided acceptor under fluidized carbon dioxide absorbing conditions. A carbon dioxide releasing vessel 102 is adapted to confine a bed 103 of acceptor under fluidized carbon dioxide releasing conditions. A fuel cell 104, corresponding to the fuel cell illustrated in Figure 1, is maintained in heat exchange relation with the bed 103 of carbon dioxide releasing acceptor. If desired, the fuel cell 104 may be embedded within the bed 103 as shown in Figure 4.

Air is introduced through the air supply conduit 105 into the bottom of the carbon dioxide releasing vessel 102 for maintaining the bed 103 under fluidized conditions and for acquiring carbon dioxide during passage therethrough. A stream of air, containing carbon dioxide and entrained particles of acceptor from the bed 103, passes from the carbon dioxide releasing vessel 102 through a conduit 106 to a cyclone 107. A "J-tube" 125 is provided to assure positive transfer of acceptor particles and to maintain the level of solids in the fluidized bed 103. The entrained particles of acceptor are discharged through a cyclone dipleg 108 into the carbon dioxide absorbing vessel 100 and solids-free air containing carbon dioxide passes through a conduit 109 for introduction into the air passage way of the fuel cell 104. Air, depleted of oxygen in the fuel cell 104, is discharged from the system along with the net product carbon dioxide through a conduit 110. The sensible heat of this stream may be recovered, for example, by transfer with incoming air in a heat exchanger 111.

Fuel gas enters the fuel cell 104 through a conduit 112 and is discharged therefrom through a conduit 113 along with the products of combustion resulting from fuel cell operation. The gases from conduit 113 are introduced into the bottom of the carbon dioxide absorbing vessel 100 to maintain the bed 101 of acceptor under fluidizing conditions and to remove carbon dioxide from the gases passing therethrough. Fuel gases, containing an equilibrium concentration of carbon dioxide, are recovered through a conduit 114 along with entrained particles of acceptor from the bed 101. A "J-tube" 126 is provided to assure positive transfer of acceptor particles and to maintain the level of solids in the fluidized bed 101. The entrained particles of acceptor are separated from the fuel gas in a cyclone 115 and are withdrawn through a cyclone dipleg 116 and deposited in the bed 103 of the carbon dioxide releasing vessel 102. Solids-free fuel gases from the cyclone 115 are reintroduced through a conduit 117 into the fuel gas supply conduit 112.

If desired, the exothermic heat from the carbon dioxide absorbing vessel 100 may be employed to generate the fuel gas required for fuel cell operation as will be described. A portion of the fuel gas containing carbon dioxide is withdrawn from the conduit 113 through a conduit 118 and employed as a carrier gas for entraining and transporting particles of finely divided carbonaceous fuel withdrawn through a conduit 119 from a carbonaceous solid fuel supply hopper 120. The suspension of carbonaceous solid fuel and recovered fuel gas containing carbon dioxide is introduced into a fluidized gasification vessel 121 maintained in heat exchange relationship with the bed 101 of the carbon dioxide absorbing vessel 100. The gases and solids react to form additional fuel gas through combination of carbon dioxide with carbon. If desired, other gasification agents such as steam and/or oxygen may be introduced to the gasification vessel 121 through the conduit 122 to supplement the fuel gas production. The fuel gases produced in the gasification vessel 121 are withdrawn through a conduit 123 to co-mingle with recycle fuel gas. Non-gasified solids may be withdrawn from the gasification vessel 121 through a conduit 124. The gasification vessel 121 may be embedded within the carbon dioxide absorbing vessel 100 as shown or may be maintained independently thereof in a heat transfer relationship. In this embodiment as in the others previously described, systems employing hydrogen as a fuel gas require removal of steam from the recirculating fuel gases to prevent buildup of inert gases. Steam condensation and removal facilities ideally may be provided in the conduit 117.

In this embodiment of the invention, no reversal of gas flow or electrodes is required. The acceptor is maintained out of contact with the electrolyte surfaces. The system is continuous with respect to gas flow, electrical power supply and the carbon dioxide balancing cycle.

Figure 5:
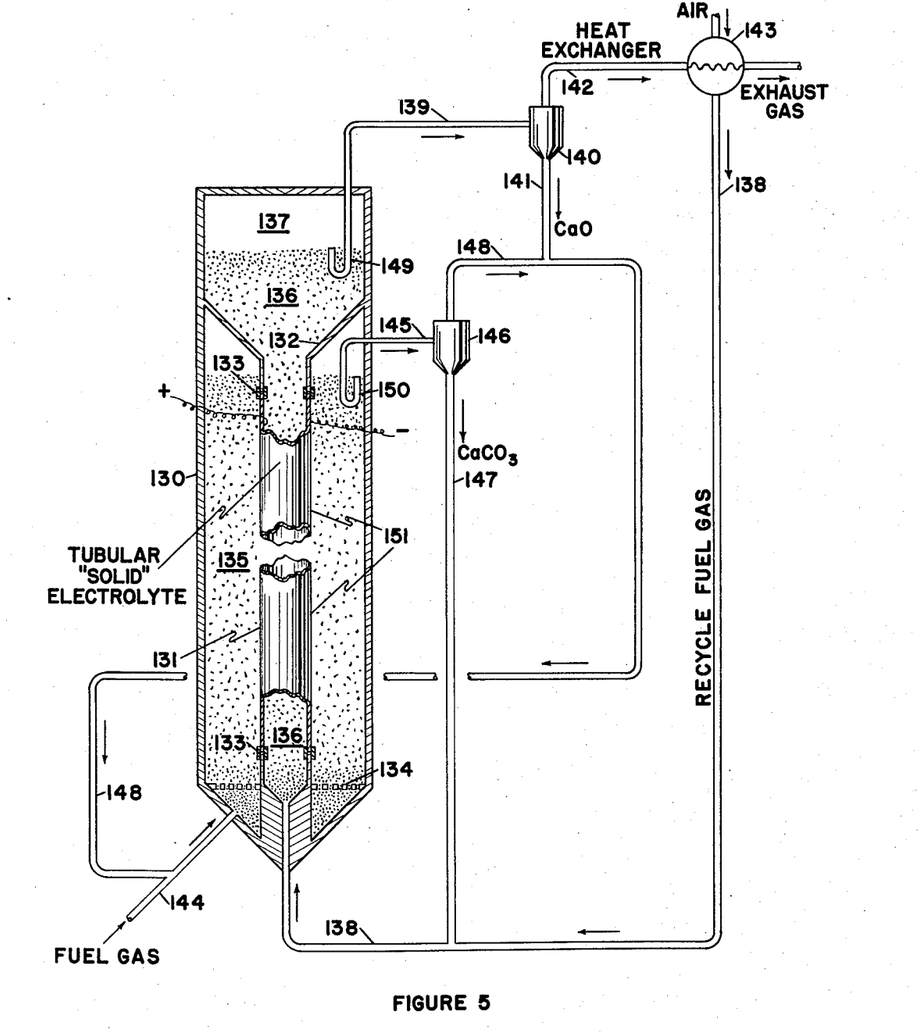
Figure 5 is a schematic flow diagram illustrating another embodiment of the present invention showing a generalized fuel cell in cross-section integrated into a continuous recirculating acceptor system which includes the gas passageways of the fuel cell itself.

The embodiment of the invention illustrated in Figure 5 provides a continuously recirculating acceptor in contact with the electrode surfaces of a fuel cell. A tubular "solid" electrolyte may be employed to effect this result. Tubular "solid" electrolytes have been described in the literature. Preferably a multiplicity of tubes is provided connected for parallel gas flow. The electrical connection between the cells may be parallel, series or a combination of both parallel and series. The inner and outer walls of such a tubular "solid" electrolyte form the electrodes which are maintained in contact with acceptor material. The central portion of the tubular "solid" electrolyte forms one gas passageway; the outer wall of the tubular electrolyte together with a housing form the other gas passageway, annular to the first.

Referring to Figure 5, a housing 130 is separated into two chambers by means of a centrally positioned tube 131 surmounted with a conical wall element 132 joining the upper end of the tube with the inner walls of the housing 130. At least a portion of the tube 131 comprises a "solid" electrolyte, indicated by the numeral 151, supported and electrically insulated from the housing by suitable insulating means 133. An annular grid plate 134 is provided at the bottom of the housing 130 beneath the tubular electrolyte 151 for supporting a fluidized bed of acceptor 135 under carbon dioxide absorbing conditions in the annular space defined by the outer wall of the "solid" electrolyte 151 and the housing 130. A fluidized bed 136 of finely divided acceptor solids is maintained under carbon dioxide releasing conditions within the tube 131 and the expanded chamber 137 defined by the top of the housing 130 and the conical wall 132. Preferably the central portion defined by the tube 131 is employed as the air passageway and the annular chamber containing the fluidized bed 135 is employed as the fuel gas passageway. The electrode surfaces of the "solid" electrolyte tube 151 are not shown. Air is introduced into the central portion containing the fluidized bed 136 of acceptor through an air supply conduit 138 for fluidizing the bed 136 and serving as the oxidizing gas for the fuel cell process. Carbon dioxide, released from the acceptor in the bed 136, serves to counteract concentration polarization in the electrolyte 151 as previously described. Gases leaving the chamber 137 through a conduit 139 comprise oxygen-depleted air, carbon dioxide and some entrained particles of solid acceptor. A "J-tube" 149 is provided to assure positive transfer of acceptor particles and to maintain the level of solids in the fluidized bed 136. A cyclone 140 is provided to separate the gases from the entrained solids which are recovered through a cyclone dipleg 141. The remaining gases are discharged from the system through a conduit 142. Their sensible heat may be recovered as, for example, in a heat exchanger 143 employed for preheating incoming air supply.

Fuel gases which have passed through the fluidized bed 135 are removed, containing an equilibrium carbon dioxide concentration, through a conduit 145. A quantity of particles of acceptor from the bed 135 is entrained in the gases withdrawn through conduit 145. A "J-tube" 150 is provided to assure positive transfer of acceptor particles and to maintain the level of solids in the fluidized bed 135. The solid particles are removed in a cyclone 146 and recovered through a cyclone dipleg 147. Solids-free fuel gas, containing an equilibrium carbon dioxide concentration, is recovered through a conduit 148 and employed as a carrier gas for the acceptor solids flowing through the cyclone dipleg 141. The entrained acceptor solids in fuel gases are recycled through the conduit 148 to the fuel gas supply conduit 144 for reuse in the fuel cell process. The acceptor solids flowing through the cyclone dipleg 147 are entrained in the air flowing through air supply conduit 138 and introduced into the central chamber containing the fluidized bed 136 of solid acceptor particles.

The acceptor bed 135 is maintained under carbon dioxide absorbing conditions, the acceptor bed 136 is maintained under carbon dioxide releasing conditons. The carbon dioxide absorbed on acceptor in the bed 135 is released in the bed 136. The net carbon dioxide produced in the operation of the fuel cell is discharged from the system through the conduit 142.

Fuel gas, having an equilibrium carbon dioxide content, is introduced through a conduit 144 beneath the grid 134 in the annular chamber. Fuel gases serve to maintain the solid acceptor particles in the bed 135 under fluidized conditions whereby a large fraction of the carbon dioxide resulting from fuel cell operation will be absorbed and removed from the vapor phase.

Preferably, as shown in Figure 5, the air stream containing carbon dioxide passes through the center of the tubular solid electrolyte 151 and the fuel gas passes over the periphery since this configuration provides greater exposed electrolyte surface for the rate controlling combustion reaction. It is within the skill of the art, following the teaching herein, to provide apparatus for the alternative gas flow pattern if desired. Moreover, the "solid" electrolyte provided for this embodiment need not be of tubular configuration as shown. It should be apparent that a plate of "solid" electrolyte as shown in Figure 1, for example, could be adapted to the practice of this embodiment.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In the method of generating electrical energy through electrochemical combustion of fuel gases with oxygen in an electrochemical cell having therein two gas passageways separated by an oxygen-transferring electrolyte comprising carbonate and having a first electrode surface which is in communication with fuel gases from one gas passageway and a second electrode surface spaced from the first and being in communication with oxygen-containing gas from the other gas passageway, the improvement comprising removing carbon dioxide from the fuel gases by absorption on a solid particulate acceptor, recovering carbon dioxide from said solid particulate acceptor by passing the oxygen-containing gas through said acceptor whereby carbon dioxide is released and commingled with the oxygen-containing gas in the oxygen-containing gas passageway, and recovering electrical energy from the two electrode surfaces.

2. In the method of generating electrical energy through electrochemical combustion of fuel gases with oxygen in an electrochemical cell having therein two gas passageways separated by an oxygen-transferring electrolyte comprising carbonate which has a first electrode surface in communication with one gas passageway and a second electrode surface, spaced from the first and in communication with the other gas passageway, the improvement comprising maintaining a supply of solid particulate acceptor in each of said gas passageways under $CO_2$ absorbing conditions whereby $CO_2$ formed by combustion of fuel gases therein will be absorbed by said acceptor, concurrently passing oxygen-containing gas through the other of said gas passageways under $CO_2$ releasing conditions whereby $CO_2$ previously absorbed on said acceptor is released into said oxygen-containing gas, continuing the described gas flow until the $CO_2$ absorbing properties of the acceptor in contact with fuel gas become substantially diminished and the $CO_2$ releasing properties of the acceptor in contact with oxygen-containing gas become substantially diminished, thereupon reversing the gas flow so that oxygen-containing gas passes through the gas passageway formerly used for fuel gas and fuel gas passes through the passageway formerly used for oxygen-containing gas, and recovering electrical energy from the two electrode surfaces during periods of gas flow through said gas passageways.

3. The method of claim 2 wherein the solid particulate acceptor is a mixture of calcium oxide and calcium carbonate.

4. In the method of generating electrical energy through electrochemical combustion of fuel gases with oxygen in an electrochemical cell having therein two gas passageways separated by an oxygen-transferring electrolyte comprising carbonate which has a first electrode surface in communication with one gas passageway and a second electrode surface spaced from the first and in communication with the other gas passageway, the improvement comprising passing oxygen-containing gas through solid particulate acceptor under $CO_2$ releasing conditions whereby said oxygen-containing gas is preheated and combined with $CO_2$ released from said acceptor, introducing thus treated oxygen-containing gas and $CO_2$ into one of said gas passageways, concurrently passing a first stream of fuel gas substantially free of $CO_2$ into the other of said gas passageways and recovering therefrom a gas mixture comprising unreacted fuel gas and $CO_2$, passing said gas mixture through solid particulate acceptor under $CO_2$ absorbing conditions for removing $CO_2$ therefrom, recycling thus treated fuel gas, and recovering electrical energy from the two electrical surfaces.

5. The method of claim 4 wherein the said solid particulate acceptor under $CO_2$ releasing conditions receives thermal energy directly from said electrochemical cell.

6. The method of claim 5 wherein solid particulate acceptor cyclically absorbs $CO_2$ from said fuel gases under $CO_2$ absorbing conditions and thereafter, under $CO_2$ releasing conditions, releases $CO_2$ to said oxygen-containing gases.

7. The method of claim 4 wherein exothermic heat resulting from absorption of $CO_2$ by the solid particulate acceptor is employed to supply at least in part the heat requirements of an endothermic fuel gas generation stage wherein carbon is reacted with a reactant gaseous compound in its highest state of oxidation to produce fuel gas required for said electrochemical cell.

8. In the method of generating electrical energy through electrochemical combustion of fuel gases with oxygen in an electrochemical cell having therein two gas passageways separated by an oxygen-transferring electrolyte comprising carbonate and having a first electrode surface which is in communication with fuel gases from one gas passageway and a second electrode surface spaced from the first and being in communication with oxygen-containing gas from the other gas passageway, the improvement comprising passing gases fom said first gas passageway in contact with a first batch of solid particulate acceptor under $CO_2$ absorbing conditions, recovered fuel gases substantially free of $CO_2$ for recirculation in said fuel gas passageway, passing air in contact with a second batch of solid particulate acceptor under $CO_2$ releasing conditions, recovering air containing $CO_2$ for use in the said oxygen-containing gas, continuing the described gas flow until the $CO_2$ absorbing properties of said first batch of acceptor and the $CO_2$ releasing properties of said second batch of acceptor become substantially diminished, thereupon interchanging said first and second batches of acceptor whereby the gases from said fuel gas passageway pass in contact with said second batch of acceptor and air passes in contact with said first batch of acceptor, and recovering electrical energy from the two electrode surfaces.

9. In the method of generating electrical energy through electrochemical combustion of fuel gases with oxygen in a fuel cell having therein two gas passageways separated by an oxygen-transferring electrolyte comprising carbonate and having a first electrode surface which is in communication with fuel gases from one gas passageway and a second electrode surface spaced from the first and being in communication with oxygen-containing gas from the other gas passageway, the improvement comprising maintaining a continuously recirculating acceptor system containing solid particulate acceptor for $CO_2$ between a first gas treating zone containing acceptor under $CO_2$ absorbing conditions and a second gas treating zone containing acceptor under $CO_2$ releasing conditions, passing air through said second gas treating zone to accumulate $CO_2$ prior to its introduction into the oxygen-containing gas passageway of the fuel cell, passing fuel gases recovered from the fuel gas passageway of the fuel cell through said first gas treating zone for removal therefrom of $CO_2$, recirculating the effluent gases to the fuel gas passageway of the fuel cell and recovering electrical energy from the two electrode surfaces.

10. The method of claim 9 wherein the fuel cell is maintained in heat exchange relation with the first gas treating zone containing acceptor under $CO_2$ releasing conditions.

11. The method of claim 10 wherein fuel gas is generated in a gasification zone via endothermic reaction and the said gasification zone is maintained in heat exchange relation with the second gas treating zone containing acceptor under $CO_2$ absorbing conditions.

12. In the method of generating electrical energy through electrochemical combustion of fuel gases with oxygen in an electrochemical cell having therein two gas passageways separated by an oxygen-transferring electrolyte comprising carbonate and having a first electrode surface which is in communication with fuel gases from one gas passageway and a second electrode surface spaced from the first and being in communication with oxygen-containing gas from the other gas passageway, the improvement comprising continuously recirculating a solid particulate acceptor between said fuel gas passageway where $CO_2$ absorbing conditions prevail and said oxygen-containing gas passageway wherein $CO_2$ releasing conditions prevail, passing air through said oxygen-containing gas passageway in contact with acceptor, passing fuel gas through said fuel gas passageway in contact with acceptor, recirculating fuel gas back into said fuel gas passageway, and recovering electrical energy from said electrode surfaces.

References Cited in the file of this patent

UNITED STATES PATENTS

| 1,963,550 | Greger | June 19, 1934 |
| 2,384,463 | Gunn | Sept. 11, 1945 |
| 2,581,651 | Gorin | Jan. 8, 1952 |

FOREIGN PATENTS

| 21,098 | Great Britain | of 1894 |

OTHER REFERENCES

Vinal, G. W.: "Primary Batteries," John Wiley and Sons, New York, 1950 (QC 603 V5), pp. 26–27.